2,929,759
FLUORO-SUBSTITUTED PHOSPHONIC ESTER PESTICIDES

Everett E. Gilbert, Morris Township, Morris County, Julian A. Otto, Lake Tamarack, and John J. Donleavy, North Caldwell, N.J., assignors to Allied Chemical Corporation, a corporation of New York No Drawing. Application November 22, 1957
Serial No. 698,033

15 Claims. (Cl. 167—22)

This invention relates to the production of new fluoro-substituted phosphonic esters useful as active insecticidal and miticidal toxicants.

These new fluoro-substituted phosphonic esters conform to the general formula

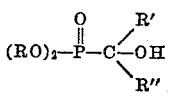

in which R is an alkyl radical, particularly an alkyl radical containing from 1 to 4 carbon atoms, R' is a member of the group consisting of methyl, fluoromethyl and phenyl and R'' is a fluoroalkyl radical, particularly a fluoroalkyl radical containing from 1 to 3 carbon atoms.

In the new compounds, typical examples of R are $CH_3$, $C_2H_5$, $C_3H_7$ and $C_4H_9$. Typical examples of R' are $CH_3$, $CHF_2$ and $C_6H_5$. Typical examples of R'' are $CHF_2$, $C_2F_5$, $C_3F_7$ and $CF_3$.

Fluoro-substituted phosphonic esters of the general formula given above may be prepared by reacting fluoro-substituted ketones with dialkyl phosphites. This reaction may be represented by the following equation in which R, R' and R'' have the meanings given above:

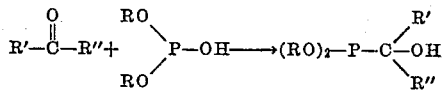

Although the fluoro-substituted ketone and dialkyl phosphite may be charged in molar proportions of 1 mol of fluoro-substituted ketone to about 0.8 to 1.2 mols of dialkyl phosphite, approximately equimolar proportions of the reactants are preferred.

If desired, the present reaction may be carried out in the presence of an inert organic solvent, preferably one lower boiling than the phosphonic ester produced. Suitable inert organic solvents include methylene chloride, hexane, benzene and acetone. When the reactions are completed, lower boiling solvents so used may be recovered for reuse by simple distillation at atmospheric or lower pressure.

The reaction of this invention may be conducted at any temperature up to the decomposition point of the reactants and is preferably carried out at about 20° to 100° C. Frequently, the reaction is quite vigorous during addition of the reactants, in which instance cooling is desirable to retard the reaction.

The following examples are given for the purpose of illustrating the present invention but are not intended to be limiting on the scope thereof. Parts are by weight.

*Example 1.*—50 parts of phenyl pentafluoroethyl ketone were mixed with 24.5 parts of dimethyl phosphite in a reaction vessel. The reaction mixture was heated on a steam bath for 20 hours at a temperature of about 90° C. The reaction mixture was slurried with a solvent mixture of about 200 parts of methylene chloride and 100 parts of hexane and was then cooled to about 0° C. A solid material formed which was collected on a filter and washed with about 50 parts of the above solvent mixture. 24 parts of a white solid having a melting point of 125–127° C. were obtained. This solid comprised the following fluoro-substituted phosphonic ester:

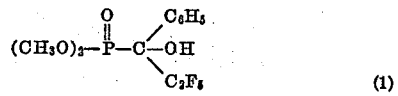

The amount of phosphonic ester collected constituted 28% of theory.

*Example 2.*—50 parts of phenyl heptafluoropropyl ketone were mixed with 20 parts of dimethyl phosphite in a reaction vessel. The reaction mixture was heated on a steam bath for 20 hours at a temperature of about 90° C. The reaction mixture was slurried with a solvent mixture of about 200 parts of methylene chloride and 100 parts of hexane and was then cooled to 0° C. A solid material formed which was collected on a filter and washed with about 50 parts of the above solvent mixture. 17 parts of a solid having a melting point of 127–128° C. were obtained. This solid comprised the following fluoro-substituted phosphonic ester:

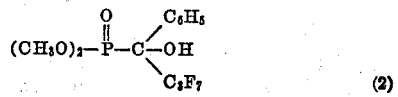

The amount of phosphonic ester collected constituted 24% of theory.

*Example 3.*—39 parts of tetrafluoroacetone were placed in a reaction vessel provided with a stirrer. 41.4 parts of diethyl phosphite were added dropwise over a 10-minute period with stirring and cooling to maintain the reaction mixture at a temperature of 30° C. (±5° C.). The reaction was continued for about 20 minutes, holding the temperature at 40–45° C. After stirring for 1 additional hour, the reaction mixture was allowed to stand for a few days. The reaction mixture was then heated to 80° C. at 2.5 mm. mercury pressure. The residue comprised 73.5 parts of the following phosphonic ester:

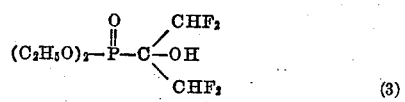

The amount of phosphonic ester collected constituted 92% of theory.

*Example 4.*—39 parts of teterafluoroacetone were placed in a reaction vessel provided with a stirrer. 33 parts of dimethyl phosphite were added dropwise over a 10-minute period with stirring and cooling to maintain the reaction mixture at 30° C. (±5° C.). The reaction was continued for about 20 minutes, while holding the temperature at 40–45° C. After stirring for an additional hour, the reaction mixture was allowed to stand at room temperature for a few days. The reaction mixture was then heated to 80° C. at 2.5 mm. mercury pressure. The residue comprised 69 parts of the following fluoro-substituted phosphonic ester:

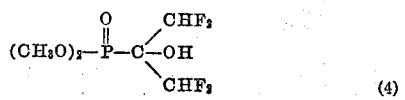

The amount of phosphonic ester collected constituted 96% of theory.

*Example 5.*—55 parts of dimethyl phosphite were charged into a reaction vessel provided with a gassing tube, a stirrer and a Dry Ice-cooled condenser. 66 parts of trifluoroacetone gas were fed into the vessel through the gassing tube. The temperature of the reaction mixture rose to 34° C. and was held relatively constant by the trifluoroacetone reflux, the rate of which increased as more trifluoroacetone was added. The reaction mixture was then heated at reflux for 5 hours, the temperature being maintained at about 34° C. The reaction mixture was allowed to stand overnight and was then heated at reduced pressure. First, unreacted trifluoroacetone (36 parts) was stripped off. Then, the reaction mixture was vacuum distilled at 2.5 mm. mercury pressure. 38 parts distilled over at 38° to 51° C., and the residue comprised 32.5 parts of the following intermediate phosphonic ester:

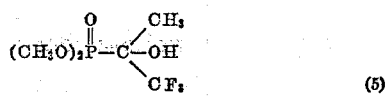
(5)

The amount of phosphonic ester collected constituted 29% of theory.

As indicated above, the fluoro-substituted phosphonic esters of this invention find valuable application as active insecticidal and miticidal toxicants. These compounds are ordinarily applied as toxicants for combating insect and mite pests, in conjunction with a carrier which may be a solid, liquid or gaseous material. For this purpose, the phosphonic esters may be employed either in the form of aqueous sprays or dust compositions and the amount of toxicant used may vary, a sufficient quantity being utilized to provide the required toxicity.

When employed in the form of a powder or dust for killing insects and mites, the above compounds or toxicants may be mixed with a substantial proportion of any suitable inert material or diluent, preferably in finely divided form, such as known grades of prepared parasiticide carrier clays, pyrophyllite, fuller's earth, bentonite, sulfur, lime, talc, whiting, diatomaceous earth, etc. Suitable dusts of this type usually contain not less than 0.25% and preferably not less than 0.5% by weight of toxicant.

Liquid insecticide or miticide sprays containing the toxicants of the invention may be prepared by first forming a solution of the compound in a suitable organic solvent, e.g., xylene, methylated naphthalenes or any highly aromatic petroleum-type insecticide oil, and preferably adding a small amount of wetting or emulsifying agent commonly employed in the art, such as diglycol oleate or p-isooctyl phenyl ether or polyethylene glycol. The resulting concentrate solution is incorporated with water in quantity sufficient to form an aqueous spray dispersion or emulsion having the desired active ingredient concentration.

In a preferred embodiment, aqueous spray dispersions or emulsions may be formed by incorporating in water dry mixtures or so-called wettable spray powders containing the phosphonic esters of the invention. These mixtures may also include inert diluents, suitable quantities of wetting or emulsifying agents and, if desired, secondary toxicants.

The aqueous spray dispersions of the invention preferably should contain the active ingredient in an amount not less than 1/16 of a pound per 100 gallons of spray, the more usual concentrations being in the range of 1/16 to 1/4 of a pound per 100 gallons of spray.

Insecticidal and miticidal properties of the phosphonic esters typical of those embraced within the scope of this invention are shown in the following table. In the table parts are by volume unless otherwise indicated.

| Fluoro-Substituted Phosphonic Ester | Formulation | Housefly Kill, percent b | Mite Kill, percent c | Pea Aphid Kill, percent d |
|---|---|---|---|---|
| Compound (1) | 1 part of a solution of phosphonic ester in acetone a per 19 parts water. | | 86.9 | |
| Compound (2) | 1 part of a solution of phosphonic ester in acetone a per 19 parts water containing 0.5% Elvanol 51-05 (commercial water-soluble synthetic polyvinyl alcohol). | | 91.6 | |
| Compound (4) | 1 part of a solution of phosphonic ester in acetone a per 1,279 parts sugar solution (20 pounds of sugar diluted to 100 gallons with water). | 90.1 | | |
| Compound (3) | 1 part of a solution of phosphonic ester in acetone a per 1,279 parts sugar solution (20 pounds of sugar diluted to 100 gallons with water). | 88.5 | | |
| Compound (4) | 1 part of a solution of phosphonic ester in acetone a per 159 parts water. | | 93.9 | 95.0 |
| Compound (3) | 1 part of a solution of phosphonic ester in acetone a per 79 parts water. | | 93.7 | 80 | a 4.8 grams of phosphonic ester dissolved in acetone to 100 cc.
b The tests on toxicity to houseflies (*Musca domestica*) were run by spraying the indicated formulation onto glass plates and allowing them to dry. The flies were confined over the plates, and percent kill was recorded 24 hours after confinement.
c The tests on toxicity to mites (*Tetranychus bimaculatus*) were run by spraying the indicated formulation onto horticultural (cranberry) bean plants infested with mites. Following treatment, the plants were stored on racks in irrigated trays under greenhouse conditions. Mortality counts were made 3 days after treatment.
d The tests on toxicity to pea aphids (*Macrosiphum pisi*) were run by removing the pea aphids from infested plants, placing them on a wire screen and spraying them with the indicated formulation. Following treatment the pea aphids were confined to untreated broad bean plants. Record of kill was made 3 days after treatment.

While we have described the preferred embodiments for carrying out our invention, it will be apparent that many changes may be made without departing from the spirit of the invention.

We claim:

1. A fluoro-substituted phosphonic ester having the following general formula:

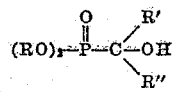

in which R is an alkyl radical containing from 1 to 4 carbon atoms, R' is a member of the group consisting of methyl, fluoromethyl and phenyl radicals and R'' is a fluoroalkyl radical containing from 1 to 3 carbon atoms.

2. A fluoro-substituted phosphonic ester having the following formula:

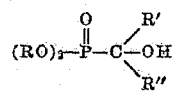

in which R is an alkyl radical containing from 1 to 4 carbon atoms, R' is a fluoromethyl radical and R'' is a fluoroalkyl radical containing from 1 to 3 carbon atoms.

3. A fluoro-substituted phosphonic ester having the following general formula:

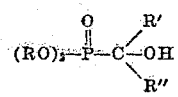

in which R is an alkyl radical containing from 1 to 4 carbon atoms, R' is a phenyl radical and R'' is a fluoroalkyl radical containing from 1 to 3 carbon atoms.

4. The fluoro-substituted phosphonic ester having the following formula:

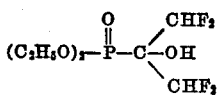

5. The fluoro-substituted phosphonic ester having the following formula:

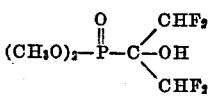

6. Insecticidal and miticidal compositions comprising a fluoro-substituted phosphonic ester having the following general formula:

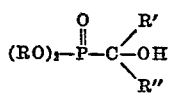

wherein R is an alkyl radical containing from 1 to 4 carbon atoms, R' is a member of the group consisting of methyl, fluoromethyl and phenyl radicals and R" is a fluoroalkyl radical containing from 1 to 3 carbon atoms, together with a carrier therefor.

7. Insecticidal and miticidal compositions comprising a fluoro-substituted phosphonic ester having the following general formula:

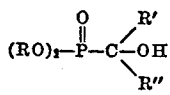

wherein R is an alkyl radical containing from 1 to 4 carbon atoms, R' is a fluoromethyl radical and R" is a fluoroalkyl radical containing from 1 to 3 carbon atoms, together with a carrier therefor.

8. Insecticidal and miticidal compositions comprising a fluoro-substituted phosphonic ester having the following general formula:

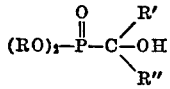

wherein R is an alkyl radical containing from 1 to 4 carbon atoms, R' is a phenyl radical and R" is a fluoroalkyl radical containing from 1 to 3 carbon atoms, together with a carrier therefor.

9. Insecticidal and miticidal compositions comprising the fluoro-substituted phosphonic ester having the following formula:

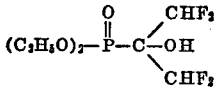

together with a carrier therefor.

10. Insecticidal and miticidal compositions comprising the fluoro-substituted phosphonic ester having the following formula:

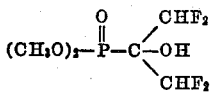

together with a carrier therefor.

11. The process of combatting insect and mite pests which comprises exposing said pests to a fluoro-substituted phosphonic ester having the following general formula:

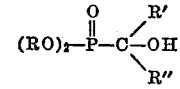

wherein R is an alkyl radical containing from 1 to 4 carbon atoms, R' is a member of the group consisting of methyl, fluoromethyl and phenyl radicals and R" is a fluoroalkyl radical containing from 1 to 3 carbon atoms.

12. The process of combatting insect and mite pests which comprises exposing said pests to a fluoro-substituted phosphonic ester having the following formula:

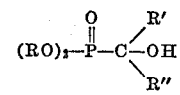

wherein R is an alkyl radical containing from 1 to 4 carbon atoms, R' is a fluoromethyl radical and R" is a fluoroalkyl radical containing from 1 to 3 carbon atoms.

13. The process of combatting insect and mite pests which comprises exposing said pests to a fluoro-substituted phosphonic ester having the following general formula:

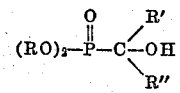

wherein R is an alkyl radical containing from 1 to 4 carbon atoms, R' is a phenyl radical and R" is a fluoroalkyl radical containing from 1 to 3 carbon atoms.

14. The process of combatting insect and mite pests which comprises exposing said pests to the fluoro-substituted phosphonic ester having the following formula:

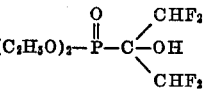

15. The process of combatting insect and mite pests which comprises exposing said pests to the fluoro-substituted phosphonic ester having the following formula:

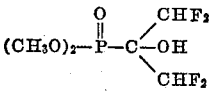

References Cited in the file of this patent

UNITED STATES PATENTS

| | | |
|---|---|---|
| 2,579,810 | Fields | Dec. 25, 1951 |
| 2,701,225 | Lorenz et al. | Feb. 1, 1955 |

FOREIGN PATENTS

| | | |
|---|---|---|
| 1,000,364 | Germany | Jan. 10, 1957 |